United States Patent
Chen

(10) Patent No.: US 11,179,877 B2
(45) Date of Patent: Nov. 23, 2021

(54) PORTABLE FILM APPLICATION APPARATUS

(71) Applicant: JIANGMEN IGUARDER ELECTRONIC CO., LTD., Jiangmen (CN)

(72) Inventor: Haiying Chen, Jiangmen (CN)

(73) Assignee: JIANGMEN IGUARDER ELECTRONIC CO., LTD., Jiangmen (CN)

( * ) Notice: Subject to any disclaimer, the term of this patent is extended or adjusted under 35 U.S.C. 154(b) by 0 days.

(21) Appl. No.: 16/346,330

(22) PCT Filed: Sep. 14, 2018

(86) PCT No.: PCT/CN2018/105764
§ 371 (c)(1),
(2) Date: Jun. 2, 2020

(87) PCT Pub. No.: WO2020/010693
PCT Pub. Date: Jan. 16, 2020

(65) Prior Publication Data
US 2020/0290265 A1    Sep. 17, 2020

(51) Int. Cl.
*B29C 63/02* (2006.01)
*B29C 63/00* (2006.01)

(52) U.S. Cl.
CPC .......... *B29C 63/02* (2013.01); *B29C 63/0004* (2013.01)

(58) Field of Classification Search
CPC . B29C 63/02; B29C 63/0004; B29C 63/0047; B29C 63/48; B29C 63/0056; B29C 63/0095; B29C 2063/0008; B29C 2063/027; B29C 65/7802; B29C 66/342; B29C 66/861; B32B 37/003; B32B 37/0046; B32B 38/1833; B32B 38/1841;
(Continued)

(56) References Cited

U.S. PATENT DOCUMENTS

2015/0041069 A1  2/2015  Wadsworth et al.
2016/0059531 A1  3/2016  Zhang et al.

FOREIGN PATENT DOCUMENTS

CN    105438531 A    3/2016
CN    105531099 A    4/2016
(Continued)

OTHER PUBLICATIONS

Machine translation of KR 101252750 date unknown.*

*Primary Examiner* — John L Goff, II
(74) *Attorney, Agent, or Firm* — R. Neil Sudol; Henry D. Coleman

(57) ABSTRACT

A portable film application apparatus includes a base, a positioning seat, a film holder, a conveyor and a film detaching device, wherein a positioning station and a film sticking station are provided on two sides of the base, respectively. The positioning seat is disposed at an end of the positioning station to lock the position of an electronic device. The film holder is disposed at an end of the film sticking station to lock the position of a film. The conveyor slides the positioning seat alternately between the positioning station and the film sticking station to match the electronic device with a membrane. The film detaching device is disposed at an end of the film sticking station to separate a release layer from the membrane.

9 Claims, 5 Drawing Sheets

(58) Field of Classification Search
CPC .............. B32B 38/10; B32B 2037/109; B32B 2307/584; B32B 2457/20; B32B 2457/202; B32B 2457/204; B32B 2457/206; B32B 2457/208; B32B 43/006; B32B 2037/268; H04M 1/0202; H04B 1/3888; B29L 2031/3475; B29L 2031/3437

See application file for complete search history.

(56) References Cited

FOREIGN PATENT DOCUMENTS

| | | | | |
|---|---|---|---|---|
| CN | 106476262 | A | 3/2017 | |
| EP | 3030493 | | 6/2016 | |
| JP | 2016-49742 | | 4/2016 | |
| KR | 101252750 | B1 * | 4/2013 | ......... B29C 63/0004 |
| KR | 10-1853589 | | 4/2018 | |
| TW | 201615384 | A | 5/2016 | |
| TW | 1556945 | B | 11/2016 | |
| WO | WO 2015/021430 | A1 | 2/2015 | |

* cited by examiner

PORTABLE FILM APPLICATION APPARATUS

TECHNICAL FIELD

The present disclosure relates to the technical field of film application equipments for electronic devices, and in particular to a portable film application apparatus with an automatic alignment function.

BACKGROUND

In modern society, electronic devices become increasingly popular. Such an electronic device usually is an intelligent device having a touch screen. Due to the conductive property of fingers, a user may touch a key on the screen to make a call or touch a menu to obtain information. To prevent the surface of the screen from being scratched by frequent touch or friction, the user usually applies a protective film on the screen. The film usually includes a membrane with one surface adhering to an adhesive, a release layer attached to the adhesive surface of the membrane, and a protective layer attached to the other surface of the membrane. In addition, a connection label having a film positioning function may be added to release layers or protective layers of some films. Currently, the film is positioned manually. It imposes high requirements on film application personnel, causing low working efficiency and unsatisfactory film application effects. Frequently, a film is scrapped because the film is misaligned, bubbles are generated, impurities adhere to the film, or the like. During manual application of a film, first, dust needs to be cleared on a screen; then a release layer is removed, a membrane is aligned with the screen, and the adhesive surface of the membrane is attached to the screen; and finally, a protective layer is removed. During this series of operations, dust in the air easily adheres to the screen or the adhesive surface of the membrane, resulting in poor film application effects. Moreover, during manual application of the film, the film needs to be gradually applied on the screen in the axial direction, leading to complex operations and high technical requirements.

SUMMARY

In view of the problems in the prior art, an objective of the present disclosure is to provide a portable film application apparatus, which is high in film sticking efficiency, accurate in film positioning, good in film sticking effect, easy to operate and applicable to various electronic devices.

The present disclosure employs the following technical solutions.

A portable film application apparatus is provided, including a base, a positioning seat, a film holder, a conveying device and a film detaching device, wherein a positioning station and a film sticking station are provided on two sides of the base, respectively; the positioning seat is disposed at an end of the positioning station to lock the position of an electronic device; the film holder is disposed at an end of the film sticking station to lock the position of a film; the conveying device is configured to slide the positioning seat between the positioning station and the film sticking station in a reciprocating manner so as to match the electronic device with a membrane; and, the film detaching device is disposed at an end of the film sticking station to separate a release layer from the membrane. The film sticking process is as follows: an electronic device is placed on the positioning seat and a film is placed on the film holder; the conveying device is pushed to convey the electronic device from the positioning station to the film sticking station, and the film detaching device separates the release layer from the membrane during this process; the membrane is fitted onto the electronic device by pressing; the conveying device then conveys the electronic device from the film sticking station to the positioning station, and the protection layer is separated from the membrane during this process; and finally, the electronic device is taken out, and the film sticking is completed. The operation is simple, the film sticking efficiency is high, the film positioning is accurate, and the film sticking effect is good.

As a further improvement of the above technical solution, the film detaching device is disposed below the conveying device and includes a film detaching seat; a snap matched with a connection tag is protruded at an end of a surface of the film detaching seat near the positioning station, and the release layer is separated from the membrane under the action of the snap; and, an accommodating chamber matched in size with the release layer is further formed in the film detaching seat to store the separated release layer.

As a further improvement of the above technical solution, a material exiting channel for allowing the film detaching seat to slide into or out from the base is formed on the base at an end of the film sticking station, in order to take out the release layer stored in the accommodating chamber. A number of guide wheels are embedded on two sides of the material exiting channel, and the film detaching seat is in sliding fit with the guide wheels; and, an elastic fastener assembly is connected to an end of the film detaching seat facing the positioning station to secure the film detaching seat into or retreat the film detaching seat from the material exiting channel. Thus, it is ensured that the release layer can be successfully separated from the membrane, and at the same time, it is convenient to take out the release layer, and the operation is easy.

Advantageously, U-shaped grooves are formed on surfaces of the guide wheels, and raised ribs are formed on two sides of the film detaching seat. Since the raised ribs are of a U-shaped structure, the film detaching seat slides more smoothly.

As a further improvement of the above technical solution, the film application apparatus further includes a dedusting roller configured to remove dust on the surface of the electronic device; the dedusting roller is arranged at a junction of the positioning station with the film sticking station to remove dust at a position to be filmed on the electronic device before film sticking; and, a first elastic element for elastically adjusting the dedusting roller up and down is provided at a position where the dedusting roller is matched with the base, such that the dedusting roller is adapted to various types of electronic devices, and the friction of the dedusting roller on the surface of the electronic device is increased, providing a better dust removal effect.

As a further improvement of the above technical solution, a secondary dedusting roller resisted against the dedusting roller up and down is arranged above the dedusting roller, and the surface viscosity of the secondary dedusting roller is greater than that of the dedusting roller, so that the dust adsorbed on the surface of the dedusting roller is transferred to the surface of the secondary dedusting roller, the dust removal effect of the dedusting roller is further improved and the service life is prolonged.

As a further improvement of the above technical solution, the film holder includes a positioning frame arranged on the base, a process groove is formed and penetrates through a middle portion of the positioning frame, and convex columns are symmetrically arranged on the positioning frame to hold the film above the process groove, so that the film is matched with the position to be filmed on the electronic device.

As a further improvement of the above technical solution, a film separating device for separating the protective layer from the membrane is further provided on the positioning frame, and a sliding groove is formed on the positioning frame; the film separating device includes a pulley block embedded into the sliding groove, a film separating scraper resisted against the protective layer, and a push bar connected to the film separating scraper. When in use, the push bar is manually controlled to allow the film separating scraper to sweep the surface of the protective layer, so that the connection between the membrane and the electronic device is firmer, and it is also convenient for the separation of the protective layer from the membrane.

As a further improvement of the above technical solution, the conveying device includes a guide rail that is disposed on an inner side of the base and communicates the positioning station with the film sticking station, and a slider seat connected to the positioning seat is slidably provided on the guide rail, so that the conveying device can be operated more stably with a higher accuracy.

As a further improvement of the above technical solution, the slider seat and the positioning seat are integrally formed, the positioning seat is depressed inward to form a positioning chamber for accommodating the electronic device, and a stopper is slidably provided at an end of the positioning chamber away from the film sticking station to hold different types of electronic devices. Thus, the universality is high, and it is convenient to handle the electronic devices. The slider seat and the positioning seat may also be detachably connected. Different types of electronic devices may be adapted by replacing different positioning seats.

Advantageously, the stopper includes a stopper arm, a stopper seat that is connected to the stopper arm and in sliding fit with the positioning seat, and a second elastic element that connects the stopper seat to the positioning seat to elastically return the stopper arm; idler wheels are provided on two sides of the stopper seat; and, positioning grooves are formed at junctions of the positioning seat with the idler wheels.

Advantageously, the stopper arm is connected to a pull handle for movement, and a process recess is provided at an end of the positioning chamber away from the pull handle to adapt to an electronic device with a protruded portion on the shell thereof.

As a further improvement of the above technical solution, the guide rail is of a V-shaped structure arranged on two sides of the base, mounting grooves are formed on two sides of the slider seat, and bearings in sliding fit with the guide rail are embedded into the mounting grooves. Thus, the fitting accuracy of the conveying device is higher, and the film sticking effect is better.

Advantageously, locking members are provided at two ends of the bearings in the mounting grooves, respectively, in order to prevent escaping of the bearings, so that the structure is more stable.

As a further improvement of the above technical solution, a push handle is connected to an end of the positioning seat away from the film sticking station. Thus, the operation is more convenient, and it is easy to control the reciprocating sliding of the conveying device between the positioning station and the film sticking station.

The present disclosure has the following beneficial effects: compared with the prior art, the portable film application apparatus provided by the present disclosure includes a base, a positioning seat, a film holder, a conveying device and a film detaching device, wherein a positioning station and a film sticking station are provided on two sides of the base, respectively; the positioning seat is disposed at an end of the positioning station to lock the position of an electronic device; the film holder is disposed at an end of the film sticking station to lock the position of a film; the conveying device is configured to slide the positioning seat between the positioning station and the film sticking station in a reciprocating manner so as to match the electronic device with a membrane; and, the film detaching device is disposed at an end of the film sticking station to separate a release layer from the membrane. In the present disclosure, the film sticking can be completed only by placing an electronic device and a film on the positioning seat and the film holder, respectively and sliding back and forth once using the conveying device. The present disclosure has the advantages of simple operation, high film sticking efficiency, accurate film positioning and good film sticking effect.

BRIEF DESCRIPTION OF THE DRAWINGS

To describe the technical solutions in the embodiments of the present disclosure more clearly, the accompanying drawings to be used in the description of the embodiments will be briefly described below. The accompanying drawings described hereinafter are some of the embodiments of the present disclosure, and a person of ordinary skill in the art can acquire other accompanying drawings according to these accompanying drawings without any creative effort.

The present disclosure will be further described below by embodiments with reference to the accompanying drawings.

REFERENCE NUMERALS

Figure 1:
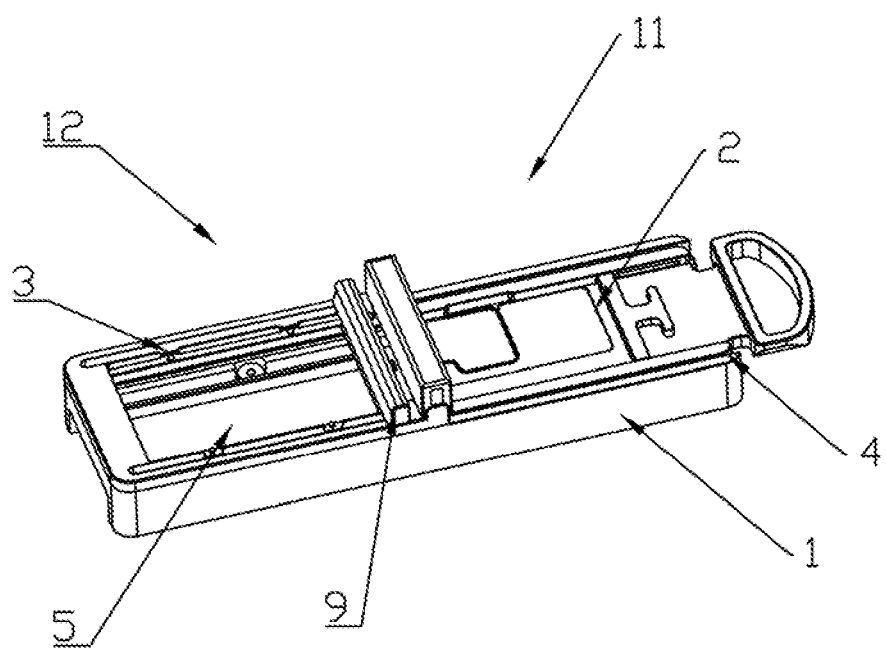
FIG. 1 is a schematic structure diagram of an embodiment of a portable film application apparatus according to the present disclosure.
Figure 2:
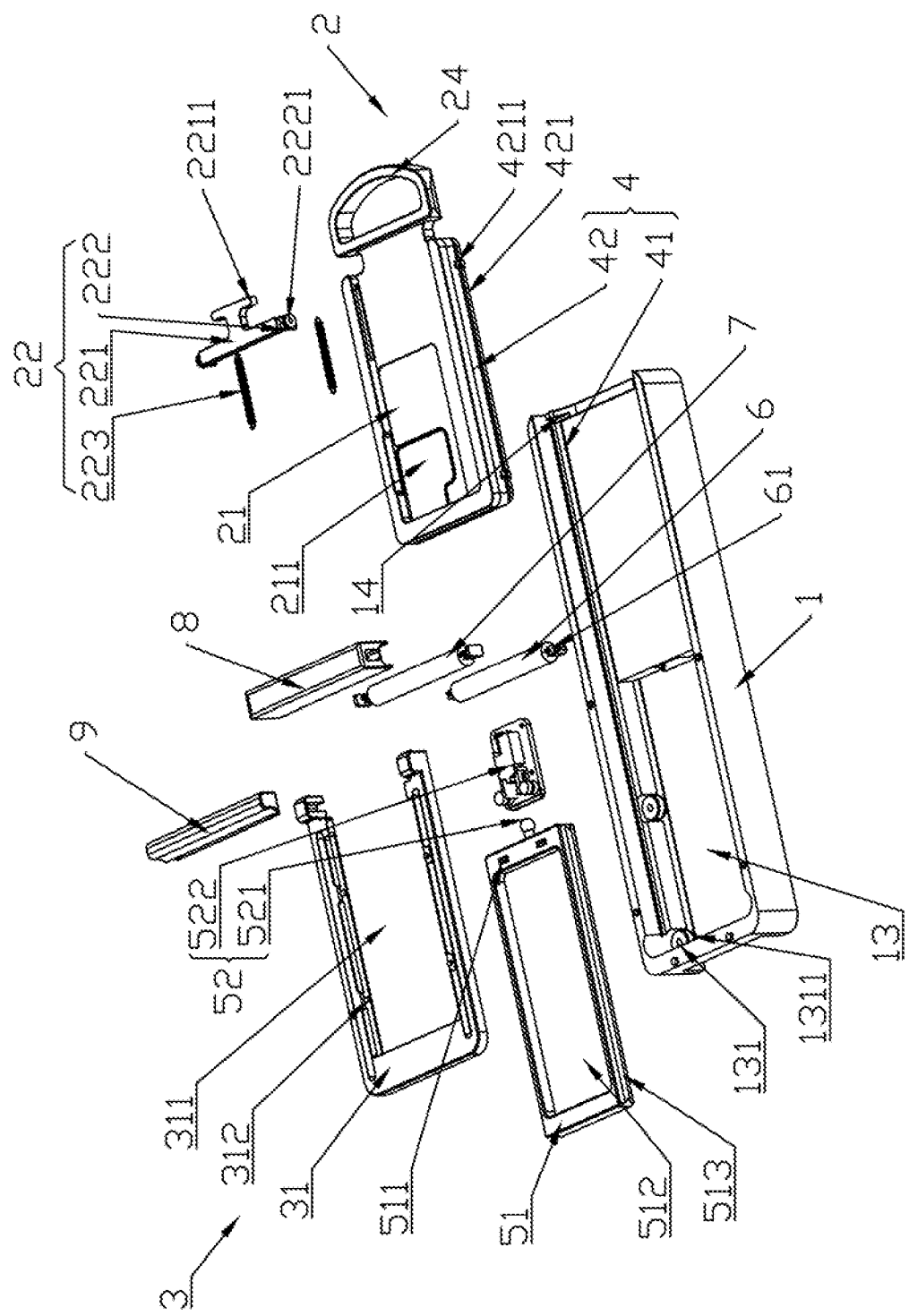
FIG. 2 is an exploded view of FIG. 1.

1: base; 2: positioning seat; 3: film holder; 4: conveying device; 5: film detaching device; 11: positioning station; 12: film sticking station; 51: film detaching seat; 511: snap; 512: accommodating chamber; 13: material exiting channel; 131: guide wheel; 52: elastic fastener assembly; 521: ball end; 522: buckle; 1311: U-shaped groove; 513: raised rib; 6: dedusting roller; 61: first elastic element; 7: secondary dedusting roller; 8: cover body; 31: positioning frame; 311: process groove; 312: convex column; 9: film separating device; 313: sliding groove; 91: pulley block; 92: film separating scraper; 93: push bar; 41: guide rail; 42: slider seat; 21: positioning chamber; 22: stopper; 222: stopper seat; 221: stopper arm; 223: second elastic member; 2221: idler wheel; 23: positioning groove; 2211: pull handle; 211: process recess; 421: mounting groove; 4211: locking member; 24: push handle; and, 14: stop block.

DETAILED DESCRIPTION

The technical solutions in the embodiments of the present disclosure will be clearly and completely described as below with reference to the accompanying drawings in the embodiments of the present disclosure. Obviously, the described embodiments are only some but not all of the embodiments of the present disclosure. All other embodiments obtained by a person of ordinary skill in the art without any creative effort on the basis of the embodiments in the present disclosure shall fall into the protection scope of the present disclosure.

Referring to FIGS. 1-5, the portable film application apparatus in this embodiment includes a base 1, a positioning seat 2, a film holder 3, a conveying device 4 and a film detaching device 5, wherein a positioning station 11 and a film sticking station 12 are provided on two sides of the base 1, respectively; the positioning seat 2 is disposed at an end of the positioning station 11 to lock the position of an electronic device; the film holder 3 is disposed at an end of the film sticking station 12 to lock the position of a film; the conveying device 4 is configured to slide the positioning seat 2 between the positioning station 11 and the film sticking station 12 in a reciprocating manner so as to match the electronic device with a membrane of the film; and, the film detaching device 5 is disposed at an end of the film sticking station 12 to separate a release layer of the film from the membrane. The film sticking process is as follows: an electronic device is placed on the positioning seat 2 and a film is placed on the film holder 3; the conveying device 4 is pushed to convey the electronic device from the positioning station 11 to the film sticking station 12, and the film detaching device 5 separates the release layer from the membrane during this process; the membrane is fitted onto the electronic device by pressing; the conveying device 4 then conveys the electronic device from the film sticking station 12 to the positioning station 11, and a protection layer of the film is separated from the membrane during this process; and finally, the electronic device is taken out, and the film sticking is completed. The operation is simple, the film sticking efficiency is high, the film positioning is accurate, and the film sticking effect is good.

In this embodiment, the film detaching device 5 is disposed below the conveying device 4 and includes a film detaching seat 51. A snap 511 matched with a connection tag on the film is protruded at an end of a surface of the film detaching seat 51 near the positioning station 11, and the release layer is separated from the membrane under the action of the snap 511. An accommodating chamber 512 matched in size with the release layer is further formed in the film detaching seat 51 to store the separated release layer. Advantageously, a material exiting channel 13 for allowing the film detaching seat 51 to slide into or out from the base 1 is formed on the base 1 at an end of the film sticking station 12, in order to take out the release layer stored in the accommodating chamber 512. A number of guide wheels 131 are embedded on two sides of the material exiting channel 13, and the film detaching seat 51 is in sliding fit with the guide wheels 131. An elastic fastener assembly 52 is connected to an end of the film detaching seat 5 1 facing the positioning station 11, and the elastic fastener assembly 512 includes a ball end 512 fixedly provided at an end of the film detaching seat 51 and a buckle 522 that is disposed on the base 1 and fitted with the ball end 512, in order to secure the film detaching seat 51 or retreat the film detaching seat 51 from the material exiting channel 13. Thus, it is ensured that the release layer can be successfully separated from the membrane, it is convenient to take out the release layer, and it is easy and convenient to operate. More advantageously, U-shaped grooves 1311 are formed on surfaces of the guide wheels 131, and raised ribs 513 are formed on two sides of the film detaching seat 51. Since the raised ribs 513 are of a U-shaped cross section, the film detaching seat 51 slides more smoothly.

Specifically, the film application apparatus further includes a dedusting roller 6 configured to remove dust on the surface of the electronic device. The dedusting roller 6 is arranged at a junction of the positioning station 11 with the film sticking station 12 to remove dust at a position to be filmed on the electronic device before film sticking. A first elastic element 61 for elastically adjusting the dedusting roller 6 up and down is provided at a position where the dedusting roller is matched with the base 1. With the first elastic element 61, the dedusting roller 6 is adapted to various types of electronic devices, and the friction of the dedusting roller 6 on the surface of the electronic device is increased, so that the dust removal effect is better. Advantageously, a secondary dedusting roller 7 is arranged above the dedusting roller 6, to abutted against the dedusting roller 6 both in an upward and downward direction, and the surface viscosity of the secondary dedusting roller 7 is greater than that of the dedusting roller 6, so that the dust adhered on the surface of the dedusting roller 6 is transferred to the surface of the secondary dedusting roller 7, such that the dust removal effect of the dedusting roller 6 is further improved and the service life is prolonged. A cover body 8 is provided around the dedusting roller 6 and the secondary dedusting roller 7, and a spring is provided where the secondary dedusting roller 7 cooperates with the cover body 8, so that the secondary dedusting roller 7 and the dedusting roller 6 are better fitted with each other.

Figure 3:
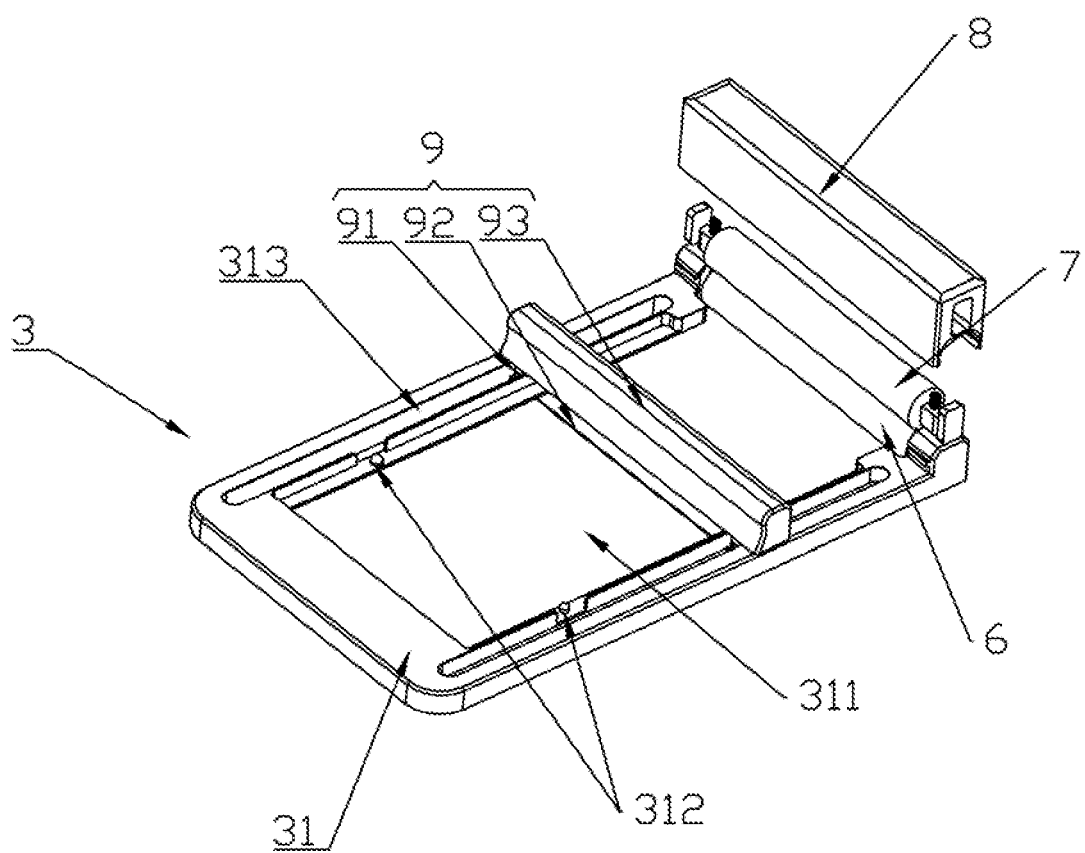
FIG. 3 is an enlarged structure diagram of a film holder, a film separating device, a dedusting roller and a secondary dedusting roller in FIG. 2.
Figure 4:
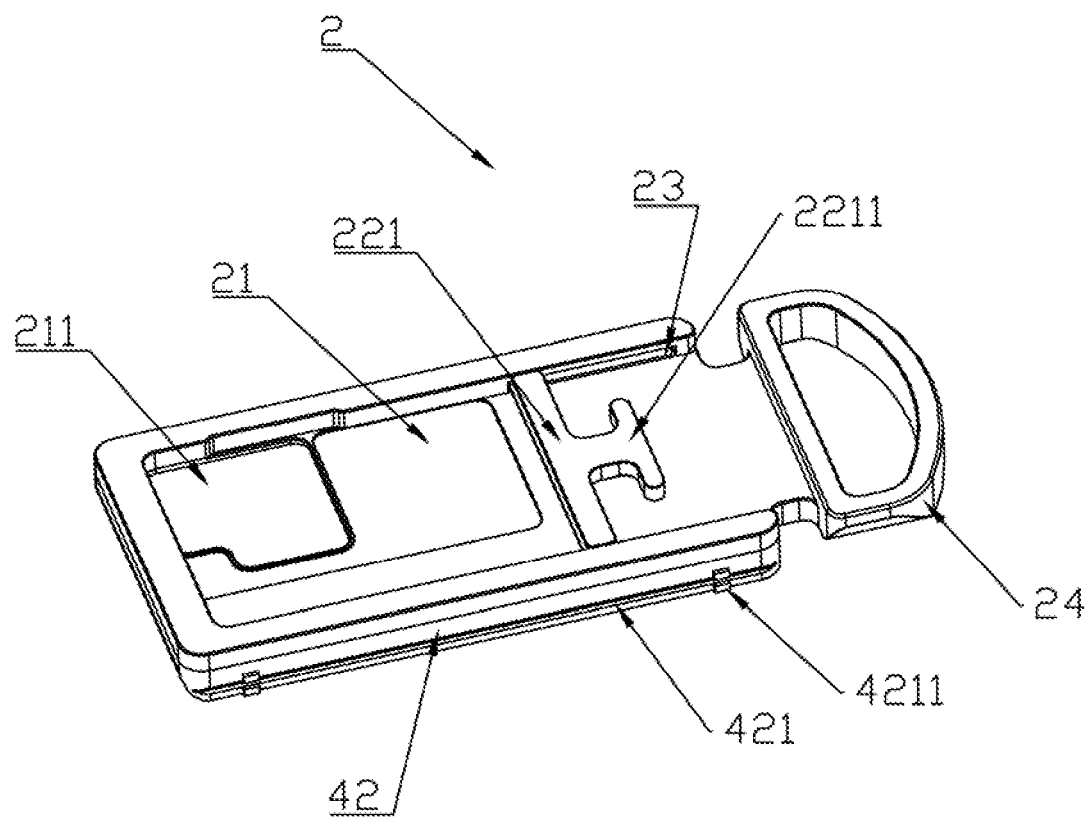
FIG. 4 is an enlarged structure diagram of a positioning seat and a slider seat in FIG. 2.
Figure 5:
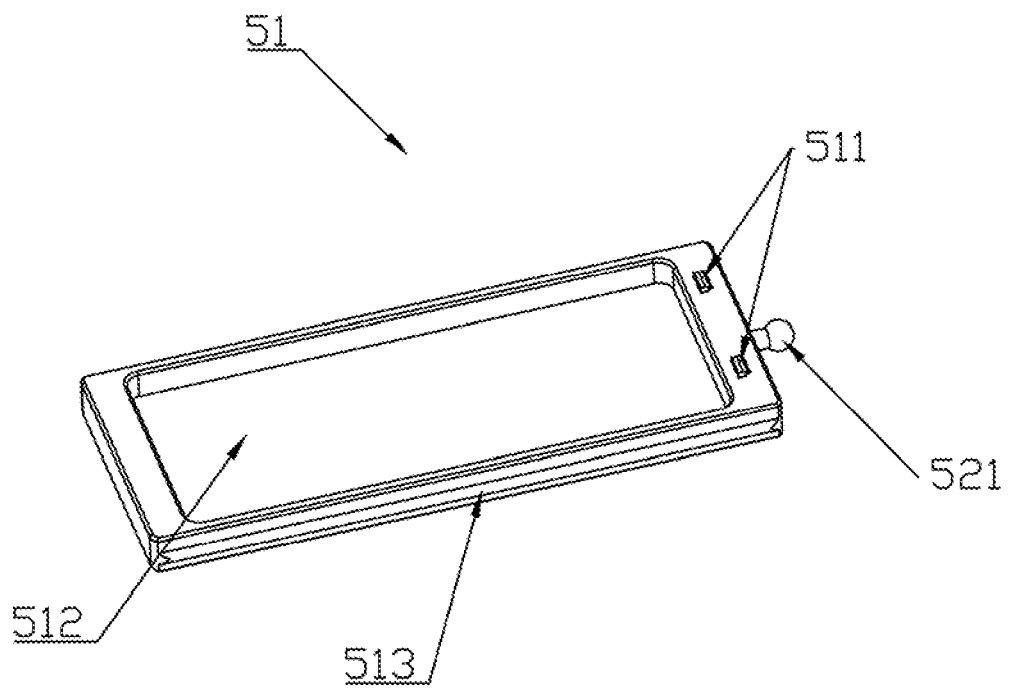
FIG. 5 is an enlarged structure diagram of a film detaching seat in FIG. 2.

As shown in FIG. 3, the film holder 3 includes a positioning frame 31 arranged on the base I, a process groove 311 is formed by a hollow middle portion of the positioning frame 31, and convex columns 312 are symmetrically arranged on the positioning frame 31 to position and hold the film above the process groove 311, so that the film is matched with the position to be applied with the film on the electronic device. Advantageously, a film separating device 9 for separating the protective layer from the membrane is further provided on the positioning frame 31. A sliding groove 313 is formed on the positioning frame 31. The film separating device 9 includes a pulley block 91 embedded into the sliding groove 313, a film separating scraper 92 resisted against the protective layer and a push bar 93 connected to the film separating scraper 92. When in use, the push bar 93 is manually controlled to allow the film separating scraper 93 to sweep the surface of the protective layer, so that the attachment between the membrane and the electronic device is firmer, and it is also convenient for the separation of the protective layer from the membrane.

Further, the conveying device 4 includes a guide rail 41 that is disposed on an inner side of the base 1 and communicates the positioning station 11 with the film sticking station 12, and a slider seat 42 connected to the positioning seat 2 is slidable on the guide rail 41, so that the conveying device 4 has more stable operation and higher accuracy. Specifically, the guide rail 41 is of a V-shaped structure arranged on two sides of the base 1, mounting grooves 421 are formed on two sides of the slider seat 42, and bearings in sliding fit with the guide rail 41 are embedded into the mounting grooves 421. Thus, the fitting accuracy of the conveying device 4 is higher, and the film sticking effect is better. Advantageously, locking members 4211 are provided at two ends of the bearings in the mounting grooves 421, respectively, in order to prevent the fall-off of the bearings so that the structure is more stable.

In this embodiment, the slider seat 42 and the positioning seat 2 are integrally formed, the positioning seat 2 is depressed inward to form a positioning chamber 21 for accommodating an electronic device, and a stopper 22 is slidably provided at an end of the positioning chamber 21 away from the film sticking station 12 to hold different types of electronic devices. Thus, this arrangement has a universality in that the electronic devices are convenient to remove. The slider seat 42 and the positioning seat 2 may also be detachably connected. Different types of electronic devices may be adapted by replacing different positioning seats 2. Specifically, the stopper 22 includes a stopper arm 221, a stopper seat 222 that is connected to the stopper arm 221 and in sliding fit with the positioning seat 2, and a second elastic element 223 that connects the stopper seat 222 to the positioning seat 2 so as to elastically return the stopper arm 221. Idler wheels 2221 are provided on two sides of the stopper seat 222. Further, positioning grooves 23 are formed at the positioning seat 2 where the positioning seat 2 cooperates with the idler wheels 2221. Advantageously, a pull handle 2211 is connected to the stopper arm 221 for movement; and a process recess 211 is provided at an end of the positioning chamber 21 away from the pull handle 2211 to adapt to an electronic device with a protruded shell portion.

In addition, a push handle 24 is connected to an end of the positioning seat 2 away from the film sticking station 12, such that it's more convenient to operate, and it's easy to control the reciprocating sliding of the conveying device 4 between the positioning station 11 and the film sticking station 12. Advantageously, a stop block 14 fitted with the slider seat 42 is provided at an end of the base 1 facing the positioning station 11 to prevent the fall-off of the positioning seat 2.

Although the preferred embodiments of the present disclosure have been specifically described by the above specific structures, the implementations and protection scope of the present disclosure are not limited thereto. Those skilled in the art can make various equivalent variations or replacements without departing from the principles of the present disclosure, and these equivalent variations or replacements shall fall into the scope defined by the appended claims of the present application.

The invention claimed is:

1. A portable film application apparatus, comprising:
   a base, wherein a positioning station and a film sticking station are respectively disposed on two sides of the base;
   a positioning seat, wherein the positioning seat is disposed on one end of the positioning station and is configured to lock a location of an electronic device;
   a film holder, wherein the film holder is disposed on one end of the film sticking station and is configured to lock a location of a film;
   a conveying device, wherein the conveying device is configured to slide the positioning seat back and forth between the positioning station and the film sticking station, to match the electronic device with a membrane; and
   a film detaching device, wherein the film detaching device is disposed on one end of the film sticking station and is configured to separate a release layer from the membrane, the film detaching device being disposed below the conveying device and comprising a film detaching seat, a snap matched with a connection tag protruding at an end of a surface of the film detaching seat near the positioning station, and an accommodating chamber matched in size with the release layer being further formed in the film detaching seat.

2. The portable film application apparatus according to claim 1, wherein a material exiting channel for allowing the film detaching seat to slide into or out from the base is formed on the base at an end of the film sticking station, and an elastic fastener assembly is connected to an end of the film detaching seat facing the positioning station to secure the film detaching seat into or retreat the film detaching seat from the material exiting channel.

3. The portable film application apparatus according to claim 1, further comprising a dedusting roller configured to remove dust on a surface of the electronic device, the dedusting roller is arranged at a junction of the positioning station with the film sticking station, and a first elastic element for elastically adjusting the dedusting roller up and down is provided at a position where the dedusting roller is matched with the base.

4. The portable film application apparatus according to claim 3, wherein a secondary dedusting roller resisted against the dedusting roller up and down is arranged above the dedusting roller, and the surface viscosity of the secondary dedusting roller is greater than that of the dedusting roller.

5. The portable film application apparatus according to claim 1, wherein the film holder comprises a positioning frame arranged on the base, a process groove is formed by a hollow middle portion through the positioning frame, and convex columns are symmetrically arranged on the positioning frame to hold the film above the process groove.

6. The portable film application apparatus according to claim 5, wherein a film separating device for separating a protective layer from the membrane is further provided on the positioning frame.

7. The portable film application apparatus according to claim 1, wherein the conveying device comprises a guide rail that is disposed on an inner side of the base and communicates the positioning station with the film sticking station, and a slider seat connected to the positioning seat is slidably provided on the guide rail.

8. The portable film application apparatus according to claim 1, wherein the positioning seat is depressed inward to form a positioning chamber for accommodating the electronic device, and a stopper is slidably provided at an end of the positioning chamber away from the film sticking station to hold different types of electronic devices.

9. The portable film application apparatus according to claim 1, wherein a push handle is connected to an end of the positioning seat away from the film sticking station.

* * * * *